United States Patent [19]
Nowlin et al.

[11] Patent Number: 4,849,389
[45] Date of Patent: Jul. 18, 1989

[54] CATALYST COMPOSITION FOR POLYMERIZING ALPHA-OLEFIN POLYMERS OF NARROW MOLECULAR WEIGHT DISTRIBUTION

[75] Inventors: Thomas E. Nowlin, Somerset; Kenneth G. Schurzky, Bridgewater, both of N.J.

[73] Assignee: Mobil Oil Corporation, New York, N.Y.

[21] Appl. No.: 143,989

[22] Filed: Jan. 14, 1988

[51] Int. Cl.$^4$ ................................................ C08F 4/64
[52] U.S. Cl. .................................... 502/107; 502/110; 502/111; 502/115
[58] Field of Search ............... 502/110, 111, 115, 125, 502/107

[56] References Cited

U.S. PATENT DOCUMENTS

| | | |
|---|---|---|
| 17,285 | 2/1887 | Lo et al. . |
| 37,680 | 4/1887 | Allen et al. . |
| 143,987 | 1/1888 | Nowlin . |
| 2,905,645 | 9/1959 | Anderson et al. ................... 252/429 |
| 2,912,419 | 11/1959 | Peters et al. ........................ 260/93.7 |
| 2,936,291 | 5/1960 | Peters et al. ........................ 252/431 |
| 3,052,660 | 9/1962 | Osgan ................................ 260/88.2 |
| 3,135,809 | 6/1964 | Bosmajian ...................... 502/103 X |
| 3,574,138 | 4/1971 | Ziegler et al. ...................... 502/117 |
| 3,787,384 | 1/1974 | Stevens et al. ..................... 260/94.9 |
| 4,148,754 | 4/1979 | Strobel et al. ...................... 252/429 |
| 4,296,223 | 10/1981 | Berger ............................ 502/134 X |
| 4,378,304 | 3/1983 | Dombro ............................. 502/111 |
| 4,458,058 | 7/1984 | Dombro ............................. 526/129 |
| 4,481,301 | 11/1984 | Nowlin et al. ...................... 502/104 |
| 4,558,024 | 12/1985 | Best .................................. 502/115 |
| 4,558,025 | 12/1985 | Best .................................. 502/115 |
| 4,579,835 | 4/1986 | Best .................................. 502/120 |
| 4,668,650 | 5/1987 | Lo et al. ............................. 502/111 |
| 4,732,882 | 3/1988 | Allen et al. ..................... 502/115 X |

Primary Examiner—Patrick P. Garvin
Attorney, Agent, or Firm—Alexander J. McKillop; Charles J. Speciale; Stanislaus Aksman

[57] ABSTRACT

A supported alpha-olefin polymerization catalyst composition is synthesized by reacting (1) a slurry of a solid catalyst carrier in a non-polar solvent, e.g., hexane, with a dialkyl organomagnesium composition; (2) contacting the slurry of step (1) with a hydroxyl group-containing compound, e.g., an alcohol; (3) contacting the slurry of step (2) with at least one transition metal compound; (4) removing the non-polar solvent to obtain a dry-flowing powder; and, (5) activating the powder with trimethylaluminum. The resulting catalyst composition is extremely active in polymerizing $C_2$–$C_{10}$ alpha-olefins and exhibits very good higher ($C_3$–$C_{10}$) alpha-olefin incorporation properties.

56 Claims, 4 Drawing Sheets

CATALYST COMPOSITION FOR POLYMERIZING ALPHA-OLEFIN POLYMERS OF NARROW MOLECULAR WEIGHT DISTRIBUTION

BACKGROUND OF THE INVENTION

1. Field of the Invention

The present invention relates to a method for polymerizing alpha-olefins, a catalyst for such a polymerization method and a method for producing such a catalyst. In particular, the present invention relates to a catalyst, and a method for preparation thereof, which produces linear low density polyethylene (LLDPE) having a narrow molecular weight distribution, as evidenced by relatively low values of melt flow ratio, (MFR), and low hexane extractables, suitable for film and injection molding applications. The invention is also directed to a highly productive polymerization process carried out with the catalyst of the invention.

2. Description of the Prior Art

Linear low density polyethylene polymers possess properties which distinguish them from other polyethylene polymers, such as homopolymers of polyethylene. Certain of these properties are described in Anderson et al, U.S. Pat. No. 4,076,698.

Karol et al, U.S. Pat. No. 4,302,566, describe a process for producing linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium compound.

Stevens et al, U.S. Pat. No. 3,787,384, and Strobel et al, U.S. Pat. No. 4,148,754, describe a catalyst prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound is present when the reacted support is contacted with the tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W.L. Carrick et al in *Journal of American Chemical Society*, Volume 82, page 1502 (1960) and Volume 83, page 2654 (1961).

Nowlin et al, U.S. Pat. No. 4,481,301, disclose a supported alpah-olefin polymerization catalyst composition prepared by reacting a support containing OH groups with a stoichiometric excess of an organomagnesium composition, with respect to the OH groups content, and then reacting the product with a tetravalent titanium compound.

Dombro, U.S. Pat. Nos. 4,378,304 and 4,458,058, disclose an olefin polymerization catalyst composition synthesized by sequentially reacting: (1) a porous support with a Group IIA organometallic compound, e.g., a dialkylmagnesium; (2) the product of (1) with water or a hydrocarbyl alcohol, e.g., methanol; (3) the product of (2) with a transition metal compound or compounds. The product of the synthesis reaction is activated with a co-catalyst which is a Group IA, IIa, IIIA and/or IIB organometallic compound, including hydrogen. Suitable co-catalysts are n-butyllithium, diethylmagnesium, triisobutylaluminum and diethylaluminum chloride.

Best, U.S. Pat. Nos. 4,558,024, 4,558,025 and 4,579,835, disclose olefin polymerization catalyst compositions prepared by reacting together a porous particulate material, an organic magnesium compound, an oxygen-containing compound, a transition metal compound, e.g., a titanium compound (the U.S. Pat. No. 4,558,024) or a vanadium compound (the U.S. Pat. No. 4,579,835), and a co-catalyst. Some of the catalyst compositions of Best also include an acyl halide (e.g, see the U.S. Pat. No. 4,579,835 and the U.S. Pat No. 4,558,025).

When the LLDPE resins are fabricated into injection-molded products, it is imperative to assure that such products are not susceptible to warping or shrinking. As is known to those skilled in the art, the degree of warping or shrinking can be predicted from the molecular weight distribution of the resins. Resins having relatively narrow molecular weight distribution produce injection-molded products exhibiting a minimum amount of warping or shrinkage. Conversely, resins having relatively broad molecular weight distribution produce injection-molded products more likely to undergo warping or shrinkage. One of the measures of the molecular weight distribution of the resin is melt flow ratio (MFR), the ratio of high melt flow index (HLMI or $I_{21}$) to melt index ($I_2$) for a given resin. The melt flow ratio is believed to be an indication of the molecular weight distribution of the polymer, the higher the MFR value, the broader the molecular weight distribution. Resins having relatively low MFR values, e.g., of about 20 to 50, have relatively narrow molecular weight distribution. Additionally, LLDPE resins having such relatively low MFR values produce films of better strength properties than resins with high MFR values. Many catalyst systems exhibit a tendency to produce resins whose MFR values, although initially low, increase with increased concentration of the catalyst activator, also known as a co-catalyst, such as various aluminum alkyls. Under certain circumstances, e.g., to improve catalyst productivity and/or comonomer incorporation, it is desirable to increase the catalyst activator concentration without substantially affecting the resin MFR.

Another important property of LLDPE resins, manufactured into products coming into contact with articles subject to FDA regulations, e.g., foodstuffs, is hexane extractables which is a measure of the amount of low molecular weight and/or highly branched polymer fractions capable of being extracted from the manufactured products, e.g., plastic food containers, by hexane extraction. The FDA imposed strict regulations on the amounts of allowable hexane extractables in such plastic products.

Thus, Allen et al, European Patent Office (EPO) Application No. 87300536.1, published on Aug. 5, 1987, as publication No. 0231102, disclose an alpha-olefin polymerization catalyst composition activated with trimethylaluminum which produces polymers having relatively low values of MRF and low hexane extractables. However, the productivity of the polymerization process carried out with such a catalyst composition is lower than that of the process carried out with the same catalyst compositions activated with more commonly-used activators, such as triethylaluminum and triisobutylaluminum.

Accordingly, it is important to provide a catalyst composition capable of producing a alpha-olefin polymers having relatively narrow molecular weight distribution (low MFR values) which remains substantially constant with varying amounts of the co-catalyst, and which catalyst composition has high activity.

It is therefore a primary object of the present invention to provide a high activity catalyst for the polymerization of alpha-olefins yielding products of a relatively narrow molecular weight distribution which is maintained substantially constant with varying amounts of the co-catalyst concentration.

It is another object of the present invention to provide a high activity catalyst composition which produces alpha-olefin polymers having relatively low hexane extractables.

It is an additional object of the present invention to provide a catalytic process for polymerizing alpha-olefins which yields linear low density polyethylene of a relatively narrow molecular weight distribution at high productivity rates.

SUMMARY OF THE INVENTION

A supported alpha-olefin polymerization catalyst composition of this invention is prepared in a multi-step process. In the first step, a mixture of a solid, porous carrier and a non-polar solvent is contacted with at least one organomagnesium composition of the formula

where R and R' are the same or different $C_4$–$C_{12}$ alkyl groups, m and n are each 0, 1 and 2, providing that m+n equals the valence of Mg. Subsequently, the mixture of the first step is contacted with at least one compound of formula (II), $R_2$—OH, where $R_2$ is a $C_1$–$C_{10}$ alkyl or a $C_1$–$C_{10}$ halogenated alkyl. The resulting mixture is then contacted with at least one transition metal compound soluble in the non-polar solvent. The product is dried and it is activated catalyst composition has very high productivity in the polymerization of alpha-olefins, very effective higher comonomer (i.e., $C_3$–$C_{10}$ alpha-olefin) incorporation properties and it produces polymers having relatively narrow molecular weight distribution and low hexane extractables.

DETAILED DESCRIPTION OF THE INVENTION

Figure 1:
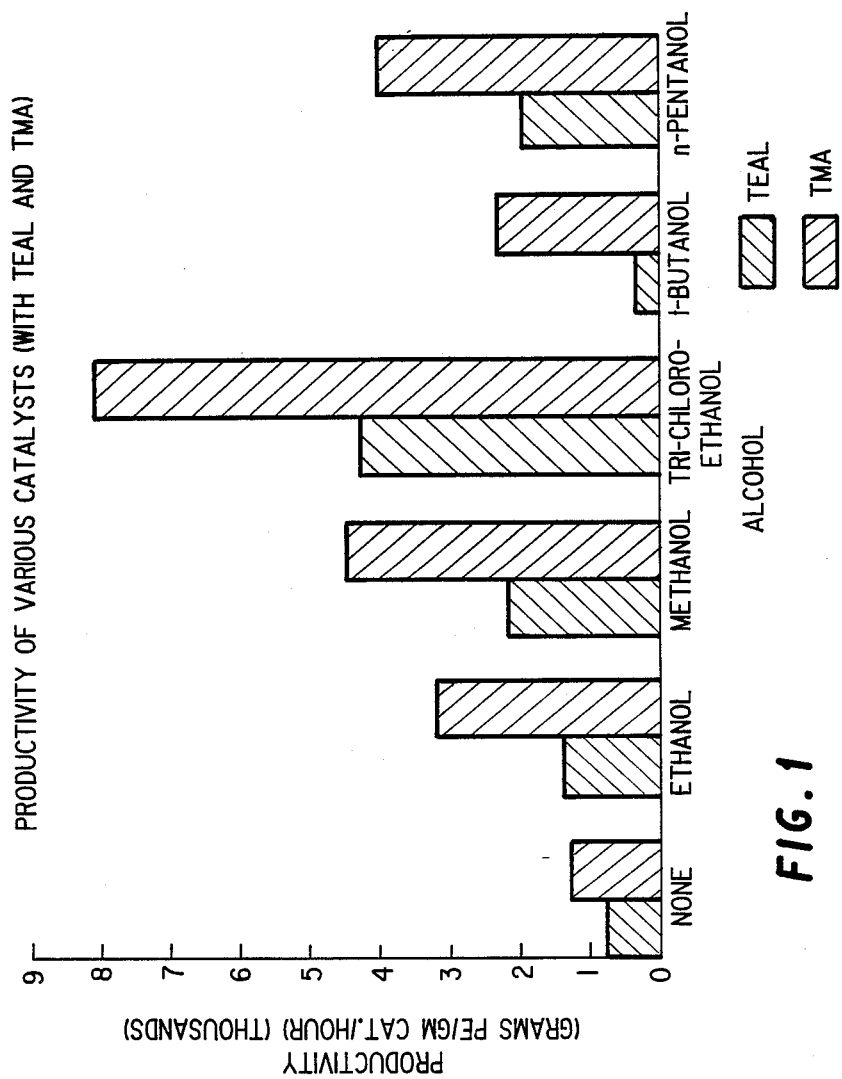
FIG. 1 is a graphical representation of productivity of various catalysts as a function of alcohols used in the synthesis.

The polymers prepared in the presence of the catalyst compositions of this invention are linear polyethylenes which are homopolymers of ethylene or copolymers of ethylene and higher alpha-olefins. The polymers exhibit relatively low values of melt flow ratio (MFR), as compared to similar polymers prepared in the presence of previously-known catalyst compositions, e.g., those disclosed by Nowlin et al, U.S. Pat. No. 4,481,301. Thus, the polymers prepared with the catalyst compositions of this invention are especially suitable for the production of films and injection molding applications.

Catalysts produced according to the present invention are described below in terms of the manner in which they are made.

CATALYST SYNTHESIS

The carrier materials are usually inorganic, solid, particulate porous materials which are inert to the other components of the catalyst composition and to the other active components of the reaction system. These carrier materials include such inorganic materials as oxides of silicon and/or aluminum. The carrier materials are used in the form of dry powders having an average particle size of from about 1 micron to about 250 microns, preferably from about 10 microns to about 150 microns. The carrier materials are also porous and have a surface area of at least about 3 square meters per gram, and preferably at least about 50 square meters per gram. The carrier material should be dry, that is, free of absorbed water. Drying of the carrier material can be effected by heating at about 100° to about 1000° C. and preferably at about 600° C. When the carrier is silica, it is heated at a temperature of at least 200° C., preferably at about 200° to about 850° C., and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing with nitrogen and heating at about 600° C. for about 16 hours to achieve a surface hydroxyl concentration of about 0.7 mmols/gm. The silica of the most preferred embodiment is a high surface area, amorphous silica (surface area=300 m²/gm; pore volume of 1.65 cm³/gm), and it is material marketed under the tradenames of Davison 952 or Davison 955 by the Davison Chemical Division of W.R. Grace and Company. The silica is in the form of spherical particles, e.g., as obtained by a spray-drying process.

The carrier material is slurried in a non-polar solvent and the resulting slurry is contacted with at least one organomagnesium composition having the empirical formula (I). The slurry of the carrier material in the solvent is prepared by introducing the carrier material into the solvent, preferably while stirring, and heating the mixture is about 25° to about 100° C., preferably about 40° to about 60° C. The slurry is then contacted with the aforementioned organomagnesium composition, while the heating is continued at the aforementioned temperature.

The organomagnesium composition has the empirical formula $R_m$ Mg $R_n'$, where R and R' are the same or different $C_4$-$C_{12}$ alkyl groups, preferably $C_4$-$C_{10}$ alkyl groups, more preferably $C_4$-$C_8$ unsubstituted alkyl groups, and most preferably both R and R' are n-butyl groups, and m and n are each 0, 1 or 2, providing that m+n is equal to the valence of Mg.

Suitable non-polar solvents are materials in which all of the reactants used herein, i.e., the organomagnesium composition, the compound of formula (II) and the transition metal compounds are at least partially soluble and which are liquid at reaction temperatures. Preferred non-polar solvents are alkanes, such as hexane, n-heptane, octane, nonane, and decane, although a variety of other materials including cycloalkanes, such as cyclohexane, aromatics, such as benzene and ethylbenzene can be employed. The most preferred non-polar solvent is hexane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium composition that will be deposited—physically or chemically—onto the support since any excess of the organomagnesium composition in the solution may react with other synthesis chemicals, and precipitate outside of the support. The carrier drying temperature affects the number of sites on the carrier available for the organomagnesium composition—the higher the drying temperature the lower the number of sites. Thus, the exact molar ratio of the organomagnesium composition to the hydroxyl groups will vary and must be determined on a case-by-case basis to assure that only so much of the ogranomagnesium composition is added to the solution as will be deposited onto the support without leaving any excess of the organomagnesium composition in the solution. Furthermore, it is believed that the molar amount of the organomagnesium composition deposited onto the support is greater than the molar content of the hydroxyl groups on the support. Thus, the molar ratios given below are intended to serve only as an approximate guideline and the exact amount of the organomagnesium composition in this embodiment must be controlled by the functional limitation discussed above, i.e., it must not be greater than that which can be deposited onto the support. If greater than the amount is added to the solvent, the excess may react with the compound of formula (II), thereby forming a precipitate outside of the support which is detrimental in the synthesis of our catalyst and must be avoided. The amount of the organomagnesium composition which is not greater than that deposited onto the support can be determined in any conventional manner, e.g., by adding the organomagnesium composition to the slurry of the carrier in the solvent, while stirring the slurry, until the organomagnesium composition is detected as a solution in the solvent.

For example, for the silica carrier heated at about 200° to about 850° C., the amount of the organomagnesium composition added to the slurry is such that the molar ratio of Mg to the hydroxyl groups (OH) on the solid carrier is about 1:1 to about 6:1, preferably about 2:1 to about 4:1, more preferably about 2.5:1 to about 3.5:1 and most preferably about 3:1, depending upon the temperature at which the carrier material was dried. The organomagnesium composition dissolves in the non-polar solvent to form a solution.

It is also possible to add such an amount of the organomagnesium composition which is in excess of that which will be deposited onto the support and then remove, e.g., by filtration and washing, any excess of the organomagnesium composition. However, this alternative is less desirable than the most preferred embodiment described above.

After the addition of the organomagnesium composition to the slurry is completed, the slurry is contacted with at least one compound of the formula (II)

$$R''-OH \tag{II}$$

where R'' is a $C_1$-$C_{10}$ alkyl group or a $C_1$-$C_{10}$ halogenated alkyl group, preferably R'' is a $C_1$-$C_{10}$ alkyl group, more preferably a $C_1$-$C_4$ normal alkyl group or a $C_1$-$C_4$ halogenated normal alkyl group, and most preferably R'' is an ethyl group. Thus, the compound of formula (II) is preferably an alcohol and most preferably ethanol. The amount of the compound of formula (II) used in this synthesis step is sufficient to convert substantially all of the magnesium alkyl (Mg—R or MgR') groups on the carrier to magnesium alkoxy (MgO R'') groups. In a preferred embodiment, the amount of the formula (II) compound added is such that substantially no excess thereof is present in the non-polar solvent after substantially all of the magnesium alkyl groups are converted to the magnesium alkoxy groups on the carrier to prevent the reaction of the formula (II) compound with the transition metal compound outside of the carrier. This synthesis step is conducted at about 25° to about 65° C., preferably at about 30° to about 55° C., and most preferably at about 30° to about 40° C.

After the addition of the formula (II) compound is completed, the slurry is contacted with at least one transition metal compound soluble in the non-polar solvent. This synthesis step is conducted at about 25° to about 65° C., preferably at about 30° to about 55° C., and most preferably at about 30° to about 40° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to 850° C., the amount of the transition metal compound is such that the molar ratio of the transition metal, derived from the transition metal compound, to the hydroxyl groups of the carrier is about 1 to about 2.0, preferably about 1.5 to about 2.0 and the molar ratio of Mg to the transition metal is about 1 to about 3, preferably about 2 to about 3. We found that these molar ratios produce a catalyst composition which produces resins having relatively low melt flow ratio (MFR) values of about 20 to about 35. As is known to those skilled in the art, such resins can be utilized to produce high strength films and injection molding products which are resistant to warping or shrinking.

Suitable transition metal compounds used herein are compounds of metals of Groups IVA, VA, VIA or VIII of the Periodic Chart of the Elements, as published by the Fisher Scientific Company, Catalog No. 5-702-10, 1978, providing that such compounds are soluble in the non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride.

Mixtures of such transition metal compounds may also be used and generally no restrictions are imposed on the transition metal compounds which may be included. Any transition metal compound that may be used alone may also be used in conjunction with other transition metal compounds. After the addition of the transition metal compound is completed, the non-polar solvent is slowly removed, e.g., by distillation or evaporation. We found that the temperature at which the non-polar solvent is removed from the synthesis mixture affects the productivity of the resulting catalyst composition. Lower solvent removal temperatures produce catalyst compositions which are substantially more active than those produced with higher solvent removal temperatures. For this reason, it is preferred to remove the non-polar solvent at about 40° to about 65° C., preferably at about 45° to about 55° C. and most preferably at about 50° C. by drying, distillation or evaporation or any other conventional means.

The resulting free-flowing powder, referred to herein as a catalyst precursor, is combined with the trimethylaluminum (TMA) activator. We found that the combination of the precursor of this invention with the TMA activator produces an alpha-olefin polymerization catalyst composition having very high activity, as compared to a catalyst composition comprising the same catalyst precursor and other, more conventional catalyst activators, such as triethylaluminum (TEAL). This is additionally surprising and unexpected because other workers in this field found that, although TMA exhibits some advantages with other catalyst precursor, it decreases the activity of such precursors, e.g., See Allen et al, EPO Application No. 87300536.7, publication No. 0 231 102, published Aug. 8, 1987.

The catalyst composition of this invention, activated with TMA, also exhibits extremely good higher alpha-olefin (i.e., $C_3$-$C_{10}$ alpha-olefin) incorporation properties when it is used to polymerize ethylene with such higher alpha-olefins. The TMA activator is used in an amount which is at least effective to promote the polymerization activity of the solid catalyst component of this invention. The amount of the TMA activator is sufficient to give an Al:transition metal molar ratio in the catalyst composition of about 15:1 to about 1000:1, preferably about 20:1 to about 300:1, and most preferably about 25:1 to about 100:1.

Without wishing to be bound by any theory of operability, it is believed that the catalyst composition of this invention is produced by chemically impregnating the support with catalyst components sequentially added to the slurry of the carrier in the non-polar solvent. Therefore, all of the catalysts synthesis chemical ingredients must be soluble in the non-polar solvent used in the synthesis. The order of addition of the reagents may also be important since the catalyst synthesis procedure is predicated on the chemical reaction between the chemical ingredients sequentially added to the non-polar solvent (a liquid) and the solid carrier material or a catalyst intermediate supported by such a material (a solid). Thus, the reaction is a solid-liquid reaction. For example, the catalyst synthesis procedure must be conducted in such a manner as to avoid the reaction of two or more reagents in the non-polar solvent to form a reaction product insoluble in the non-polar solvent outside of the solid catalyst support. Such an insoluble reaction product would be incapable of reacting with the carrier or the catalyst intermediate and therefore would not be incorporated onto the solid support of the catalyst composition.

The catalyst precursors of the present invention are prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of catalyst precursor. Purification of the non-polar solvent employed in the catalyst synthesis is also helpful in this regard.

The catalyst may be activated in situ by adding the TMA activator and catalyst separately to the polymerization medium. It is also possible to combined the catalyst and the activator before the introduction thereof into the polymerization medium, e.g., for up to about 2 hours prior to the introduction thereof into the polymerization medium at a temperature of from about −40° to about 100° C.

POLYMERIZATION

Alpha-olefins are polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out a relatively low temperature, e.g., from about 30° to about 105° C. This control of molecular weight may be evidenced by a measurable positive change in melt index ($I_2$) of the polymer produced.

The molecular weight distribution of the polymers prepared in the presence of the catalysts of the present invention, as expressed by the melt flow ratio (MFR) values, varies from about 20 to about 35, preferably about 20 to about 30, for LLDPE products having a density of about 0.900 to about 0.940, and an $I_2$ (melt index) of about 0.5 to about 100. Conversely, HDPE products, produced with the catalysts of this invention, have a density of about 0.940 to about 0.965, MFR values of about 20 to about 35, preferably about 20 to about 30, and $I_2$ values of about 0.5 to about 100. As is known to those skilled in the art, such MFR values are indicative of a relatively narrow molecular weight distribution of the polymer. As is also known to those skilled in the art, such MFR values are indicative of the polymers especially suitable for injection molding applications since the polymers having such MFR values exhibit relatively low amounts of warpage and shrinkage on cooling of the injection molded products. The relatively low MFR values of the polymers prepared with the catalysts of this invention also indicate that they are suitable for the preparation of various film products since such films are likely to have excellent strength properties. MFR is defined herein as the ratio of the high load melt index (HLMI or $I_{21}$) divided by the melt index, i.e.g, $$MFR = \frac{I_{21}}{I_2}$$

The catalysts prepared according to the present invention are highly active and may have an activity of at least about 1-14 kilograms of polymer per gram of catalyst per 100 psi of ethylene in about 1 hour.

The linear polyethylene polymers prepared in accordance with the present invention are homopolymers of ethylene or copolymers of ethylene with one or more $C_3$-$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexane terpolymers, ethylene/propylene/1-hexane terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

The linear low density polyethylene polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating it are described by Levine et al, U.S. Pat. No. 4,011,382, Karol et al, U.S. Pat. No. 4,302,566 and by Nowlin et al, U.S. Pat No. 4,481,301, the entire contents of all of which are incorporated herein by reference. The polymer produced in such a reactor contains the catalyst particles because the catalyst is not separated from the polymer.

The following examples further illustrate the essential features of the invention. However, it will be apparent to those skilled in the art that the specific reactants and reaction conditions used in the Examples do not limit the scope of the invention.

EXAMPLE 1

(Catalyst Synthesis)

20.0 grams of Davison grade 955 silica which had been heated to 600° C. for about 16 hours under a dry nitrogen purge was slurried in about 200 (milliters) mls of dry hexane contained in a 4-neck 500 ml round bottom flask kept under a continuous nitrogen purge and fitted with an overhead stirrer and a reflux condenser. The slurry was heated to and maintained are reflux, and 52.4 mls of dibutylmagnesium (DBM), 0.77 Molar solution in heptane, was added dropwise to the slurry (about 15 minutes) and the reflux continued for one hour. Next, 4.15 mls of absolute ethanol diluted in about 40 mls of dry hexane was added dropwise to the slurry (about 15 minutes) and reflux continued for an additional hour. Finally, 2.4 mls of $TiCl_4$ diluted in about 40 mls of dry hexane was added dropwise, the reflux was continued for an additional hour, and solvents were removed by distillation and dried at about 85°-90° C. to yield 21.3 grams of a dry, free-flowing powder. The resulting catalyst precursor contained 1.31 mmols of Mg/gram of the precursor, 0.731 mmols of Ti/gram of the precursor, and 2.82 mmols of Cl/gram of the precursor.

EXAMPLES 2-7

(Catalyst Synthesis)

Eight (8) additional catalyst precursor compositions were synthesized in the manner substantially the same as that of Example 1, but with different alcohols used in the synthesis. The alcohols and the Mg, Ti, Cl content of the respective catalyst precursor compositions is set forth below in Table I:

TABLE 1

| Example | Alcohol Type | Transition Metal Compound | Composition (MMOLS/GRAM of Catalyst Precursor) | | | Mole Ratio of Mg/Ti or V |
|---|---|---|---|---|---|---|
| | | | Mg | Ti or V | Cl | |
| 1 | Ethanol | $TiCl_4$ | 1.31 | 0.731 | 2.82 | 1.79 |
| 2 | Methanol | $TiCl_4$ | 1.45 | 0.802 | 2.96 | 1.82 |
| 3 | n-Butanol | $TiCl_4$ | 1.27 | 0.729 | 2.73 | 1.75 |
| 4 | n-Pentanol | $TiCl_4$ | 1.28 | 0.764 | 2.63 | 1.67 |
| 5 | t-Butanol | $TiCl_4$ | 1.33 | 0.716 | 2.67 | 1.85 |
| 6 | Trichloroethanol | $TiCl_4$ | 1.21 | 0.643 | 2.74 | 1.89 |
| 6A | Trichloroethanol | $VOCl_3$ | 1.16 | 0.489 | 2.39 | 2.38 |
| 7 | None | $TiCl_4$ | 1.49 | 0.701 | 2.70 | 2.13 |

EXAMPLES 8-14

(Polymerization Process)

The catalyst precursors of Examples 1-7 were combined with triethylaluminum (TEAL) or with trimethylaluminum (TMA) catalyst activators to produce ethylene/1-hexane copolymers. A typical polymerization was carried out as follows with the catalyst of Example 1. At about 50° C., and under a slow nitrogen purge, a 1.6 liter stainless steel autoclave, previously heated to about 80° C. under purge of dry nitrogen, was filled with 400 mls of dry hexane, 200 mls of dry 1-hexane and 3.0 mls of triethylaluminum (25 wt% in hexane). The reactor was closed, and hydrogen was introduced to raise the internal pressure to 23 psi. The contents of the reactor was stirred at 900 rpm and the temperature was increased to about 70° C.

The reactor was filled with ethylene to a total pressure of about 120 psi and then 0.1637 grams of Example 1 catalyst precursor, slurried in about 25 mols of hexane, was added to the reactor. The reactor temperature was adjusted to 80° C. and the reactor pressure was maintained with ethylene.

The polymerization was continued for 50 minutes. 200 grams of polyethylene were obtained. The polymer contained 26.5 mole % 1-hexane and it had the following properties: $I_2=0.58$; $I_{21}=16.3$; $I_{21}/I_2=28.1$; density=0.926 gm/cc.

The productivies of the catalyst compositions were determined as a function of the alcohol used in the synthesis of the catalyst precursor and of the catalyst activators. The results are illustrated graphically in FIG. 1. As is evident from FIG. 1, trichloroethanol produced the most active catalyst precursor, with the TEAL or TMA activators. However, the trichloroethanol-based catalyst system decayed relatively rapidly (half-life of about 40 minutes). The data of FIG. 1 indicates that the TMA activator produces catalyst compositions having 2-3 times greater productivities than the TEAL activator used to activate the same catalyst precursors.

EXAMPLE 15

(Comparative Catalyst Precursor Synthesis)

A comparative catalyst precursor was synthesized according to the teachings of Karol et al, European patent application No. 84103441.6, filed on Mar. 28, 1984, Publication No. 0 120 503, published on Oct. 3, 1984. This catalyst precursor is substantially equivalent to that of Karol et al, as disclosed in the aforementioned Published European Patent Application. It is also substantially equivalent to the precursors prepared by the following representative procedure.

(a) Impregnation of Support with Precursor

In a 12 liter flask equipped with a mechanical stirrer were placed 41.8 g (0.439 mol) of anhydrous MgCl$_2$ and 2.5 liters of tetrahydrofuran (THF). To this mixture, 29.0 (0.146 mol) of TiCl$_3$0.33 AlCl$_3$ were added dropwise over a ¼ hour period. The mixture was then heated at 60° C. for another ½ hour in order to completely dissolve the material.

Five hundred grams (500 g) of silica were dehydrated by heating at a temperature of 600° C. and slurried in 3 liters of isopentane. The slurry was stirred while 186 ml of a 20 percent by weight solution of triethylaluminum in hexane was added thereto over a ¼ hour period. The resulting mixture was then dried under a nitrogen purge at 60° C. over a period of about 4 hours to provide a dry, free-flowing powder containing 5.5 percent by weight of the aluminum alkyl.

The treated silica was then added to the solution prepared as above. The resulting slurry was stirred for ¼ hour and then dried under a nitrogen purge at 60° C. over a period of about 4 hours to provide a dry, impregnated, free-flowing powder.

(b) Preparation of Partially Activated Precursor (i) The silica-impregnated precursor composition prepared in accordance with step (a) was slurried in 3 liters of anhydrous isopentane and stirred while a 20 percent by weight solution of diethylaluminum chloride in anhydrous hexane was added thereto over a ¼ hour period. The diethylaluminum chloride (DEAC) solution was employed in an amount sufficient to provide 0.36 mols of this compound per mol of tetrahydrofuran (THF) in the precursor. After addition of the diethylaluminum chloride was completed, stirring was continued for an additional ¼ to ½ hour while a 20 percent by weight solution of tri-n-hexylaluminum (TNHAL) in anhydrous hexane was added in an amount sufficient to provide 0.25 mols of this compound per mol of tetrahydrofuran in the precursor. The mixture was then dried under a nitrogen purge at a temperature of 56°±10° C. over a period of about 4 hours to provide a dry, free-flowing powder. This material was stored under dry nitrogen until it was needed.

EXAMPLE 16

(Preparation of LLDPE Product With TEAL-Activated Precursor of Example 15(b))

The partially activated comparative catalyst precursor composition of Example 15(b), with the molar ratios of DEAC/THF=0.36 and TNHAL/THF=0.25, was used to prepare LLDPE product in a 1.6 liter autoclave reactor. Reaction conditions were similar to those in Example 9. The productivity was about 4,000 grams PE/gr cat/hour.

EXAMPLE 17

(Preparation of LLDPE Proccuts with TMA-Activated Comparative Precursor of Example 15(b))

The partially activated comparative precursor composition of Example 15(b) with the molar ratios of DEAC/THF=0.36 and TNHAL/THF=0.25, was used to prepare LLDPE product in a 1.6 liter autoclave reactor. Reaction conditions were substantially equivalent to those of Example 9, except that a TMA activator was used in place of TEAL. Catalyst productivity was about 4,100 gms PE/gm cat/hour.

EXAMPLE 18

(Effect of Increasing Amounts of Cocatalyst on MFR of Polymers)

To determine the effect of increasing the amount of TMA and TEAL cocatalyst on the MFR of the polymers produced with the resulting catalyst compositions, the performance of a catalyst precursor substantially similar to that of Example 1 was compared to that of the comparative catalyst precursor of Example 15b, both activated with varying amounts of the TMA or TEAL cocatalysts. The polymerizations were conducted in the manner summarized below:

400 mls of dry hexane was added to a 1.6 liter autoclave at 56° C. while under a slow nitrogen purge. 200 mls (135 grams) of 1-hexane was added, followed by TEAL or TMA. Various amounts of cocatalyst were added to give the concentration ranges shown in FIGS. 5 and 6. Concentration of co-catalyst is expressed as ppm based on the total weight of hexane and 1-hexene used in the polymerization. The reactor was closed, and hydrogen was added from a calibrated hoke bomb, the contents were stirred at 900 rpm and the temperature was increased to 70° C. Ethylene was added to the autoclave to 120 psi and about 0.03–0.06 grams of the catalyst precursor was injected with ethylene overpressure. The temperature was maintained at 80° C. and 150–200 grams of copolymer was produced in 50–60 minutes. The effect of increasing amounts of the TMA or TEAL activator on the MFR of the polymers is shown graphically in FIGS. 5 and 6.

EXAMPLES 19–20

Polymerizations were carried out similarly to Examples 9–14, except that 450 mls of hexane and 150 mls of 1-hexene were used. TEAL (3 mls of a 25 wt % solution in hexane) was used as the catalyst activator.

TABLE II

Comparision of Titanium and Vanadium Based Catalysts

| Catalyst Of Example | Example | Transition Metal | Productivity (gm/gm/hr/100 psi) | MFR ($I_{21}$) | $r_1$ |
|---|---|---|---|---|---|
| 6 | 19 | $TiCl_4$ | 5150 | 32 (75) | 101 |
| 6A | 20 | $VOCl_3$ | 730 | 81 (23) | 39 |

DISCUSSION OF EXAMPLES

The reactivity of each catalyst used to copolymerize ethylene with 1-hexene is dependent on the catalyst composition. The 1-hexene response is expressed below as a reactivity ratio, $r_1$, defined by the equation:

$$1/f = 1/r_1 \cdot F$$

where
  $f = (C_E/C_H)$copolymer
  $F = (C_E/C_H)$monomer
  $r_1 = kEE/kEH$

In the above formulae, subscripts E and H designate ethylene and hexene, respectively. Thus, lower values of $r_1$ indicate improved 1-hexene incorporation properties.

Table III summarizes the catalyst reactivity ratios with 1-hexene as a function of alcohol used or a transition metal compound on the precursor synthesis and activator.

TABLE III

| Catalyst of Example | Alcohol | Transition Metal Compound | Activator | $r_1$ |
|---|---|---|---|---|
| 1 | ethanol | $TiCl_4$ | TEAL | 196 ± 11 |
| 1 | ethanol | $TiCl_4$ | TMA | 152 ± 9 |
| 6A | 2,2,2-Trichloro-ethanol | $VOCL_3$ | TEAL | 39.1 ± 6.1 |
| 6A | same | $VOCL_3$ | TMA | 39.1 ± 6.1 |
| 6 | same | $TiCl_4$ | TEAL | 101 ± 0.8 |
| 6 | same | $TiCl_4$ | TMA | 101 ± 0.8 |
| 15(b) (Comp.) | none | $TiCl_4$ | TEAL | 130 |
| 15(b) (Comp.) | none | $TiCl_4$ | TMA | 130 |

The data of Table III indicates that the catalysts prepared with all of the alcohols, except 2,2,2-trichlororethanol, react relatively poorly with 1-hexene in the presence of TEAL as the activator ($r_1 = 196$) indicating that an ethylene molecule is inserted 196 times into the polymer molecule for every 1-hexene molecule that is inserted during the polymerization reaction. In the presence of the TMA activator, the reactivity ratio is significantly lower ($r_1 = 152 \pm 9$), indicating improved (about 22% better) 1-hexene incorporation properties with the TMA-activated catalyst precursor, i.e., an ethylene molecule is inserted 152 times for every 1-hexene molecule that is inserted into the polymer molecule.

Molecular Weight Distribution (MWD) of Polymers

Figure 2:
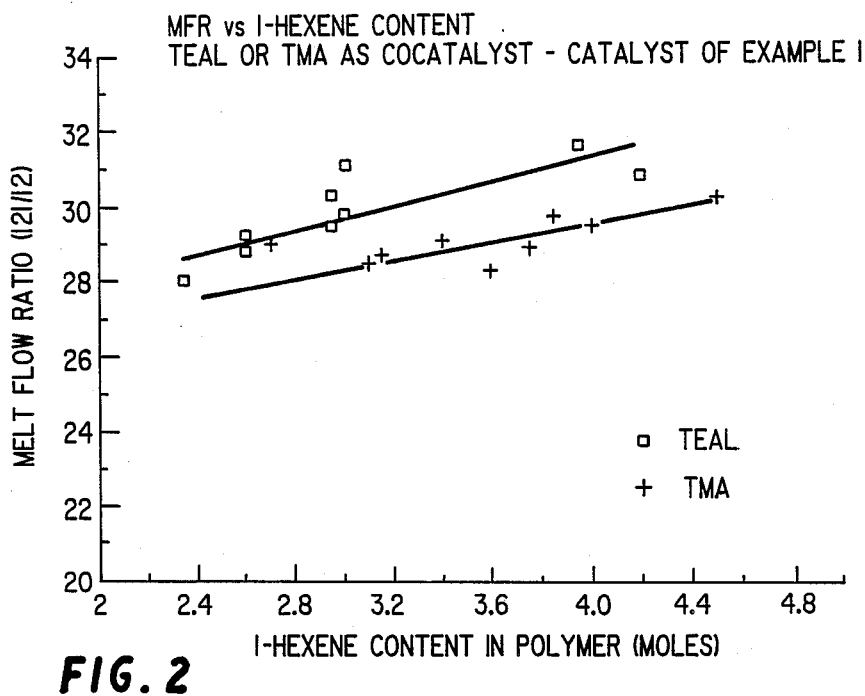
FIG. 2 is a graphical representation of melt flow ratio (MFR) as a function of 1-hexane content and catalyst activator.
Figure 3:
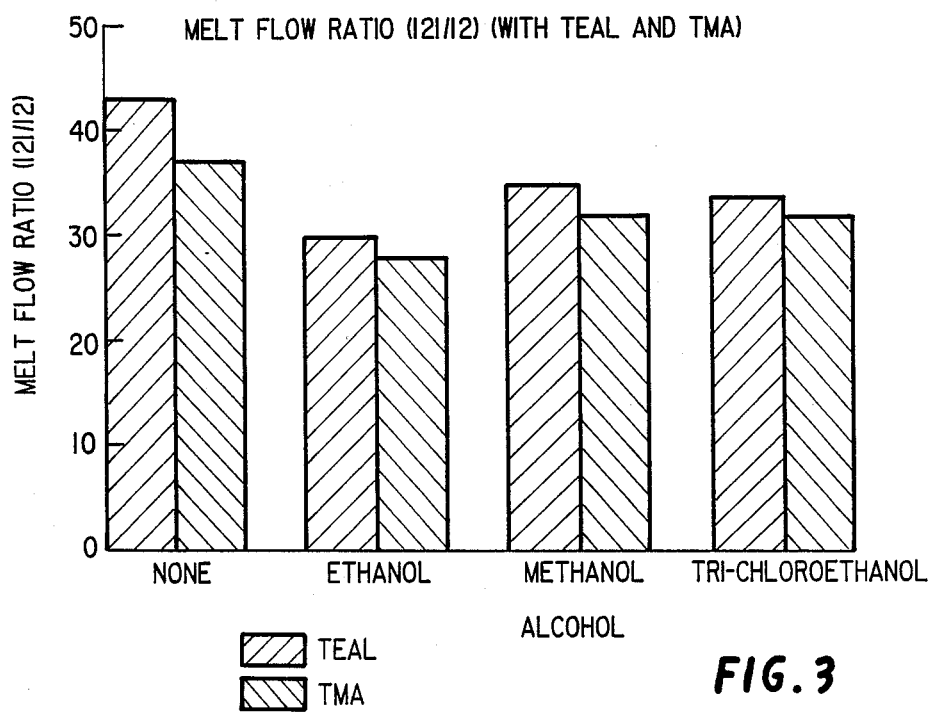
FIG. 3 is a graphical representation of the dependency of polymer MFR on the alcohol used in the catalyst synthesis and catalyst activator.

The effect of catalyst composition and cocatalysts on the MWD of the copolymers is summarized in FIGS. 2 and 3. FIG. 2 shows that the MFR for the ethanol-based catalyst of Example 1 depends on both copolymer composition and cocatalyst type. For example, the MFR increases from about 29 to 31 (TEAL) as the 1-hexene content increases. from 2.4 mole% (density of 0.926 gms/cc) to 4.0 mole % (density of 0.914 gms/cc). Over the same range, copolymers prepared with TMA as cocatalyst have MFR values from about 27 to 29. The data therefore indicates that, unexpectedly, TMA provides polymers with a narrower MWD as indicated by MFR values that are about 1–2 MFR units lower compared to polymers prepared with TEAL-activated catalysts.

FIG. 3 shows a similar trend for other catalysts (of Examples 1, 2, 6 and 7) prepared with different alcohols with TEAL or TMA as a cocatalyst. However, the copolymer prepared with an alcohol-free catalyst provided the broadest MWD, as indicated by MFR values of about 38 to about 42. Copolymers produced with catalysts synthesized with alcohol gave MFR values ranging from about 27 to about 35, depending on alcohol type and cocatalyst. Thus, catalysts based on ethanol and TMA give copolymers with the narrowest MWD. Catalysts based on methanol and 2,2,2-trichloroethanol produce copolymers with MFR values in the 32–37 range depending on density and cocatalyst. At the same density, these catalysts give products with MFR values about 2–6 units higher than copolymers prepared with the ethanol-based catalysts.

Comparison of Titanium and Vanadium Based Catalysts of Examples 6 and 6a

Two catalysts based on 2,2,2-trichloroethanol were prepared, one with $TiCl_4$ (Example 6) and one with $VOCl_3$ (Example 6A). The comparison of the effect of the transition metal on the catalyst properties is summarized in Table III.

The data in Tables II and III indicate that the catalyst based on titanium is about 7 times more active and incorporate 1-hexene about 2.5 times more slowly than the vanadium-based catalyst. However, the vanadium-based catalyst provides a copolymer with a relatively broad MWD.

Effect of Drying Temperature

Figure 4:
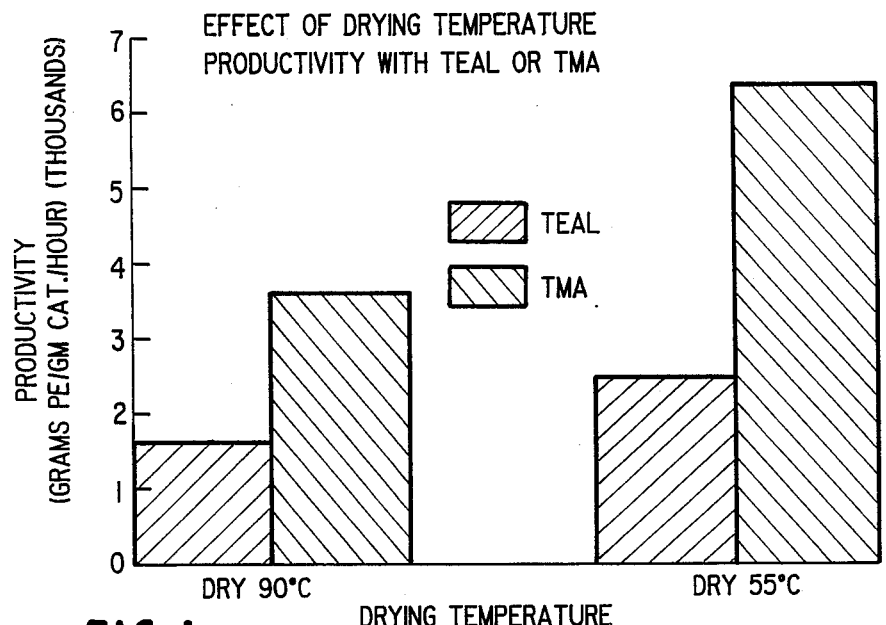
FIG. 4 is a graphical representation of the effect of the catalyst precursor drying temperature and catalyst activator on the catalyst productivity.

To test the effect, if any, of drying temperature on the catalyst properties, a catalyst was prepared in which the temperature used to remove the solvents was lowered from 90° C. (Example 1) to 55° C. Aside from the different drying temperatures, the catalyst synthesis was carried out substantially as in Example 1. The results are summarized in FIG. 4.

The data indicate that the productivity of this catalyst precursor is particularly sensitive to the drying conditions. The precursor dried at 55° C. is about 25 percent more productive than the precursor dried at 90° C. Consequently, to maintain high catalyst productivity, the catalyst precursor should preferably be dried at 40°–65° C.

Effect of Increasing Activator Amounts

Figure 5:
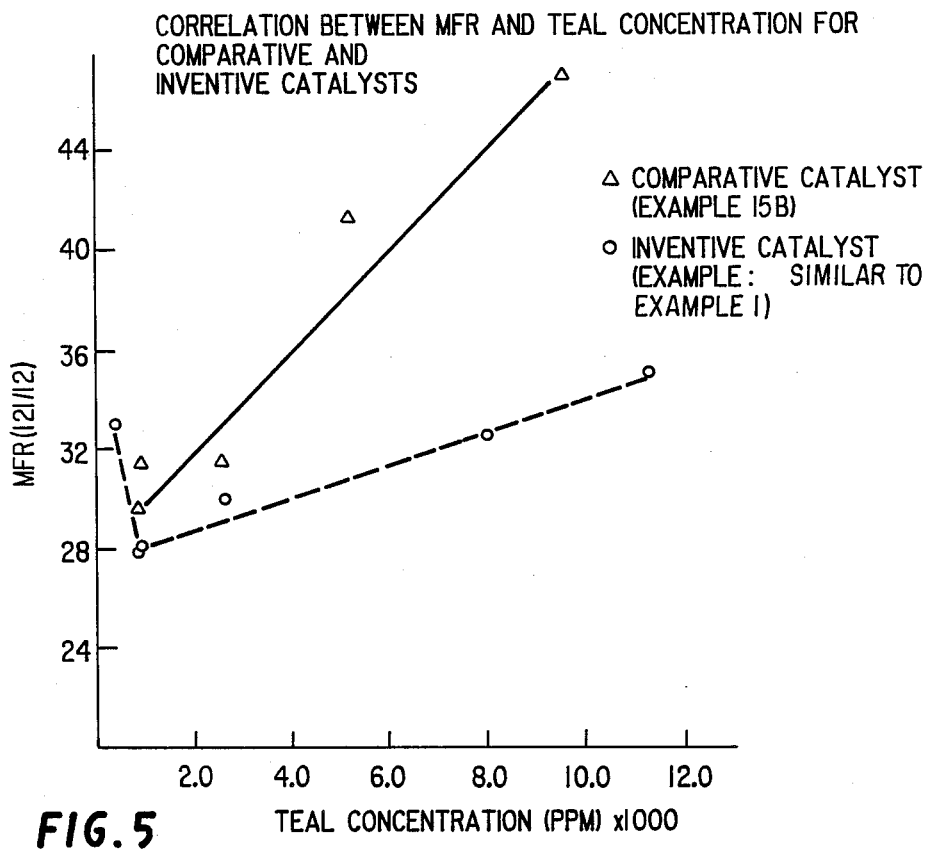
FIG. 5 is a graphical representation of the correlation between MFR and triethylaluminum activator content in the inventive and comparative catalyst compositions.
Figure 6:
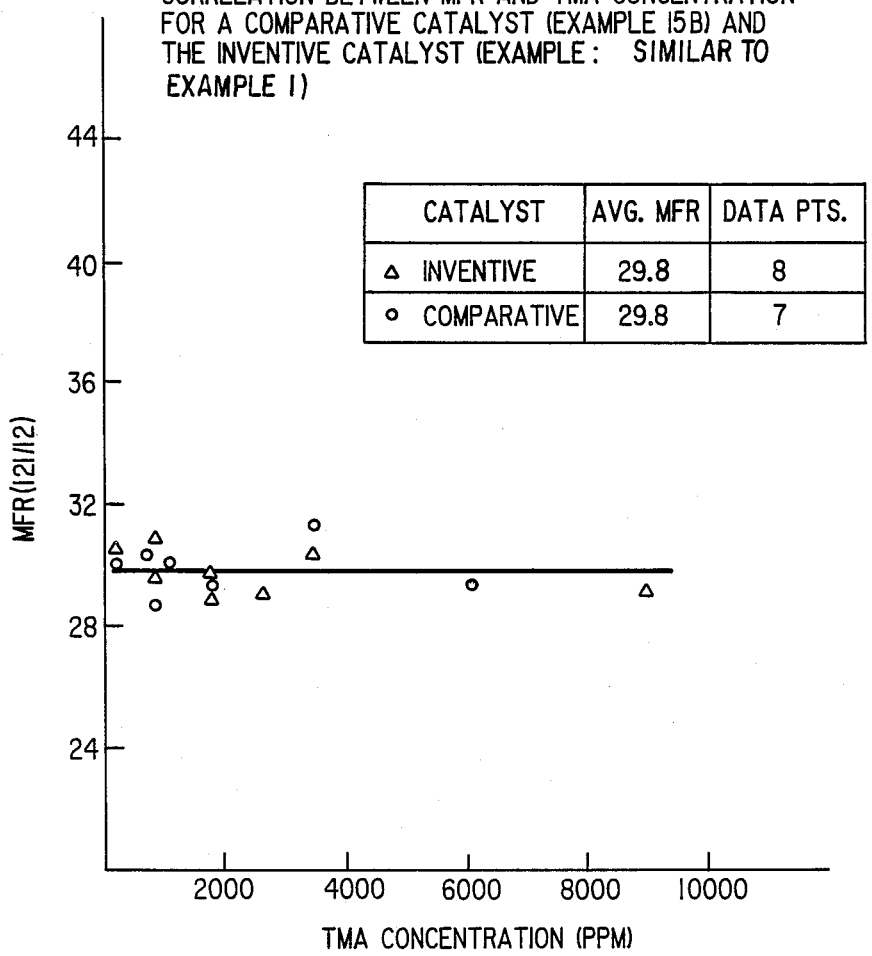
FIG. 6 is a graphical representation of the correlation between MFR and trimethylaluminum activator content in the inventive and comparative catalyst compositions.

The data of FIG. 5 indicates that increased content of TEAL produces catalyst compositions which produce polymers of increasing MFR values for both, the inventive and the comparative catalyst precursor compositions. The data of FIG. 6, however, indicates that increased content of TMA produces catalyst compositions which produce polymers of substantially constant MFR values for both the inventive and the comparative catalyst precursor compositions.

The ability to produce polymers of substantially constant low MFR values regardless of the cocatalyst content is important in order to produce the same polyethylene product with superior physical properties, such as low shrinking and warpage for injection molding applications.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A process for preparing a supported alpha-olefin polymerization catalyst composition which comprises the steps of:
   (i) contacting a slurry of a solid, porous carrier and a non-polar solvent with at least one organomagnesium composition having the formula

   $$R_m \, Mg \, R_n' \qquad (I)$$

where R and R' are the same or different $C_4$–$C_{12}$ alkyl groups, m and n are each 0, 1 or 2, provided that m+n is equal to the valence of Mg;
   (ii) contacting the slurry of step (i) with at least one compound of the formula

   $$R''{-}OH \qquad (II)$$

where R'' is a $C_1$–$C_{10}$ alkyl group or a $C_1$–$C_{10}$ halogenated alkyl group;
   (iii) contacting the slurry of step (ii) with at least one transition metal compound soluble in the non-polar solvent; and
   (iv) combining the product of step (iii) with trimethylaluminum.

2. A process of claim 1 wherein R and R' are $C_4$–$C_{10}$ alkyl groups.

3. A process of claim 2 wherein R and R' are $C_4$–$C_8$ alkyl groups.

4. A process of claim 3 wherein R and R' are each butyl groups, m is 1 and n is 1.

5. A process of claim 4 wherein the non-polar solvent is a hydrocarbon which is a liquid at ambient conditions.

6. A process of claim 5 wherein R'' is a $C_1$–$C_8$ alkyl group.

7. A process of claim 6 wherein R'' is a methyl, ethyl, propyl or butyl group.

8. A process of claim 7 wherein the transition metal compound is a compound of titanium or vanadium.

9. A process of claim 8 wherein the transition metal compound is titanium halide.

10. A process of claim 9 wherein the titanium halide is titanium tetrahalide.

11. A process of claim 10 wherein the titanium tetrahalide is $TiCl_4$.

12. A process of claim 10 wherein the amount of the $TiCl_4$ present in said step (iii) is such that the molar ratio of Mg to Ti is about 1 to about 3.

13. A process of claim 12 wherein the amount of the $TiCl_4$ present in said step (ii) is such that the molar ratio of Mg to Ti is about 2 to about 3.

14. A process of claim 13 wherein the solid, porous carrier contains OH groups.

15. A process of claim 14 wherein the amount of the organomagnesium composition used in said step (i) is such that the molar ratio of Mg:OH is about 1:1 to about 6:1.

16. A process of claim 15 wherein the amount of the organomagnesium composition used in said step (i) is such that the molar ratio of Mg-OH is about 2:1 to about 4:1.

17. A process of claim 16 wherein the amount of the organomagnesium composition used in said step (i) is such that the molar ratio of Mg:OH is about 2.1:1 to about 3.5:1.

18. A process of claim 17 wherein the amount of the organomagnesium composition used in said step (i) is such that the molar ratio of Mg:OH is about 3:1.

19. A process of claim 18 wherein the solid, porous carrier is silica which, prior to contact thereof with the solvent in step (i), is heated at a temperature of about 100° C. to about 1000° C.

20. A process of claim 19 wherein the silica is heated at a temperature of about 800° C.

21. A process of claim 20 wherein the silica has, after the heating, surface hydroxyl group concentration of about 0.5 mmoles/gr, a surface area of 300 m²/gram and a pore volume of 1.65 m³/gram.

22. A process of claim 21 wherein the product of said step (iii), prior to conducting said step (iv), is dried at about 40° to about 65° C. to substantially remove the non-polar solvent.

23. A supported alpha-olefin polymerization catalyst composition prepared by:
   (i) contacting a slurry of a solid, porous carrier and a non-polar solvent with at least one organomagnesium composition having the formula

   $$R \, Mg \, R' \qquad (I)$$

where R and R' are the same or different $C_4$–$C_{12}$ alkyl groups, m and n are each 0, 1 or 2, provided that m+n is equal to the valence of Mg;
   (ii) contacting the slurry of step (i) with at least one compound of the formula

   $$R''{-}OH \qquad (II)$$

where R'' is a $C_1$–$C_{10}$ alkyl group or a $C_1$–$C_{10}$ halogenated alkyl group;

(iii) contacting the slurry of step (ii) with at least one transition metal compound soluble in the non-polar solvent; and (iv) combining the product of step (iii) with trimethyl aluminum.

24. A catalyst composition of claim 23 wherein R and R' are C$_4$-C$_{10}$ alkyl groups.

25. A catalyst composition of claim 24 wherein R and R' are C$_4$-C$_8$ alkyl groups.

26. A catalyst composition of claim 25 wherein R and R' are each butyl groups, m is 1 and n is 1.

27. A catalyst composition of claim 26 wherein the non-polar solvent is a hydrocarbon which is a liquid at ambient conditions.

28. A catalyst composition of claim 27 whrein R'' is a C$_1$-C$_8$ alkyl group.

29. A catalyst composition of claim 28 wherein R'' is a methyl, ethyl, propyl or butyl group.

30. A catalyst composition of claim 29 wherein the transition metal compound is a compound of titanium or vanadium.

31. A catalyst composition of claim 30 wherein the transition metal compound is titanium halide.

32. A catalyst composition of claim 31 wherein the titanium halide is titanium tetrahalide.

33. A catalyst composition of claim 32 wherein the titanium tetrahalide is TiCl$_4$.

34. A catalyst composition of claim 33 wherein the amount of the TiCl$_4$ present in said step (iii) is such that the molar ratio of Mg to Ti is about 1 to about 3.

35. A catalyst composition of claim 34 wherein the amount of the TiCl$_4$ present in said step (iii) is such that the molar ratio of Mg to Ti is about 2 to about 3.

36. A catalyst composition of claim 35 wherein the solid, porous carrier contains OH groups.

37. A catalyst composition of claim 36 wherein the amount of the organomagnesium composition used in said step (i) is such that the molar ratio of Mg:OH is about 1:1 to about 6:1.

38. A catalyst composition of claim 37 wherein the amount of the organomagnesium composition used in said step (i) is such that the molar ratio of Mg:OH is about 2:1 to about 4:1.

39. A catalyst composition of claim 38 wherein the amount of the organomagnesium composition used in said step (i) is such that the molar ratio of Mg:OH is about 2.5:1 to about 3.5:1.

40. A catalyst composition of claim 39 wherein the amount of the organomagnesium composition used in said step (i) is such that the molar ratio of Mg:OH is about 3:1.

41. A catalyst composition of claim 40 wherein the solid, porous carrier is silica which, prior to contact thereof with the solvent in step (i), is heated at a temperature of about 100° C. to about 1000° C.

42. A catalyst composition of claim 41 wherein the silica is heated at a temperature of about 800° C.

43. A catalyst composition of claim 42 wherein the silica has, after the heating, surface hydroxyl group concentration of about 0.5 mmoles/gr, a surface area of 300 m$^2$/gram and a pore volume of 1.65 m$^3$/gram.

44. A catalyst composition of claim 43 wherein the product of said step (iii), prior to conducting said step (iv), is dried at about 40° to about 65° C. to substantially remove the non-polar solvent.

45. A process of claim 1 wherein in said step (i) only such an amount of the organomagnesium composition is used which will be deposited onto the carrier; in said step (ii) only such an amount of the compound of the formula (II) is used which is sufficient to convert substantially all of the magnesium alkyl groups on the carrier to magnesium alkoxy groups, so that substantially no excess of the formula (II) compound is present in the non-polar solvent after substantially all of the magnesium groups are converted to the magnesium alkoxy groups; and in said step (iii) such an amount of the transition metal compound is used which is not greater than that which can be deposited on the carrier.

46. A process of claim 8 wherein the amount of the transition metal compound present in said step (iii) is such that the molar ratio of Mg to the transition metal is about 1 to about 3.

47. A process of claim 46 wherein the amount of the transition metal compound present in said step (iii) is such that the molar ratio of Mg to the transition metal is about 2 to about 3.

48. A process of claim 46 wherein the amount of the transition metal compound present in said step (iii) is such that the molar ratio of Mg to the transition metal is about 1.65 to about 2.40.

49. A process of claim 22 wherein the produce of said step (iii), prior to conduting said step (iv), is dried at about 45° to about 55° C.

50. A process of claim 49 wherein the product of said step (iii), prior to conducting said step (iv), is dried at about 50° C.

51. A catalyst composition of claim 23 wherein in said step (i) only such an amount of the organomagnesium composition is used which will be deposited onto the carrier; in said step (ii) only such an amount of the compound of the formula (II) is used which is sufficient to convert substantially all of the magnesium alkyl groups on the carrier to magnesium alkoxy groups, so that substantially no excess of the formula (II) compound is present in the non-polar solvent after substantially all of the magnesium groups are converted to the magnesium alkoxy groups; and in said step (iii) such an amount of the transition metal compound is used which is not greater than that which can be deposited on the carrier.

52. A catalyst of claim 30 wherein the amount of the transition metal compound present in said step (iii) is such that the molar ratio of Mg to the transition metal is about 1 to about 3.

53. A catalyst of claim 52 wherein the amount of the transition metal compound present in said step (iii) is such that the molar ratio of Mg to the transition metal is about 2 to about 3.

54. A catalyst of claim 52 wherein the amount of the transition metal compound present in said step (iii) is such that the molar ratio of Mg to the transition metal is about 1.65 to about 2.40.

55. A catalyst of claim 44 wherein the product of said step (iii), prior to conducting said step (iv), is dried at about 45° to about 55° C.

56. A catalyst composition of claim 55 wherein the product of said step (iii), prior to conducting said step (iv), is dried at about 50° C.

* * * * *